Oct. 14, 1941.  W. M. SCOTT, JR  2,259,005
CIRCUIT CONTROLLING DEVICE
Original Filed Aug. 27, 1938  5 Sheets-Sheet 1

INVENTOR
William M. Scott Jr.
BY
Cornelius D. Ehret
ATTORNEY

Oct. 14, 1941.  W. M. SCOTT, JR  2,259,005
CIRCUIT CONTROLLING DEVICE
Original Filed Aug. 27, 1938   5 Sheets-Sheet 2
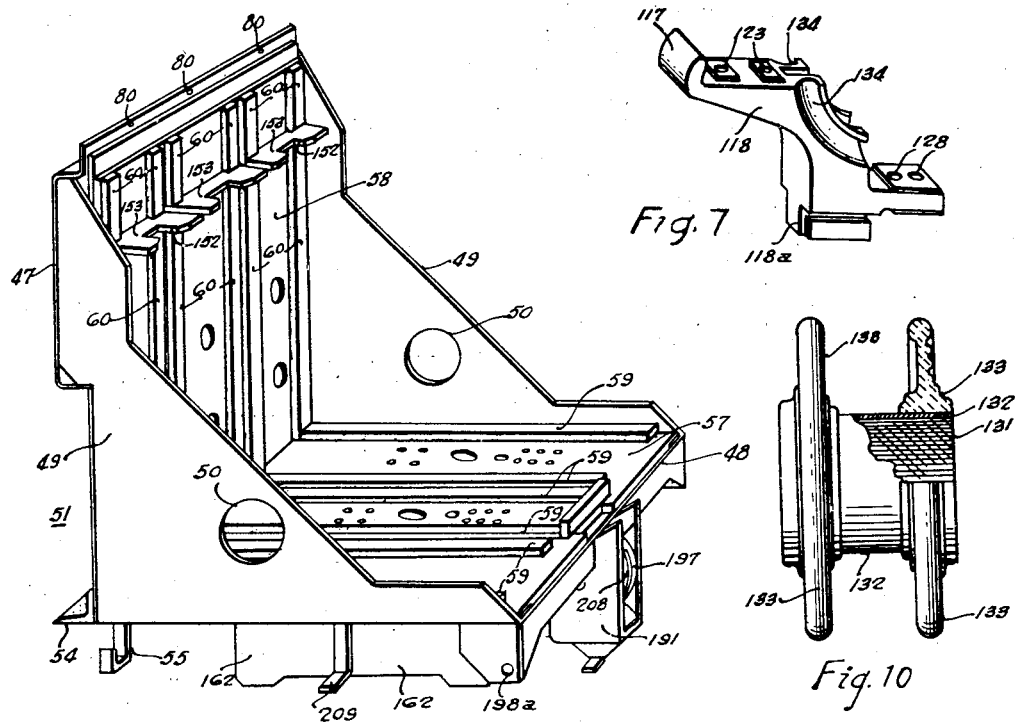
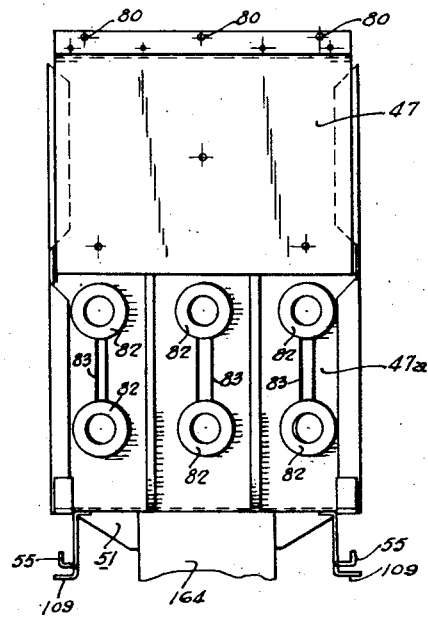
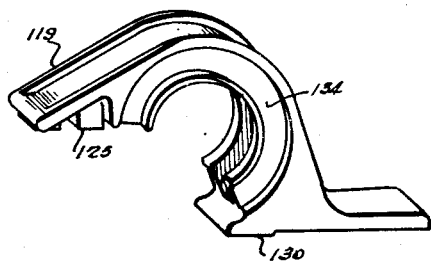
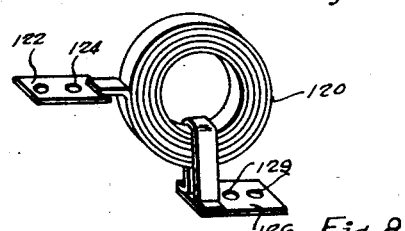
INVENTOR
William M. Scott Jr.
BY Cornelius D. Ehret
ATTORNEY Oct. 14, 1941.  W. M. SCOTT, JR  2,259,005
CIRCUIT CONTROLLING DEVICE
Original Filed Aug. 27, 1938   5 Sheets-Sheet 3

INVENTOR
William M. Scott Jr.
BY Cornelius D. Ehret
ATTORNEY

Oct. 14, 1941. W. M. SCOTT, JR 2,259,005
CIRCUIT CONTROLLING DEVICE
Original Filed Aug. 27, 1938   5 Sheets-Sheet 4

INVENTOR
William M. Scott Jr.
BY Cornelius D. Ehret
ATTORNEY

Oct. 14, 1941.  W. M. SCOTT, JR  2,259,005
CIRCUIT CONTROLLING DEVICE
Original Filed Aug. 27, 1938  5 Sheets-Sheet 5
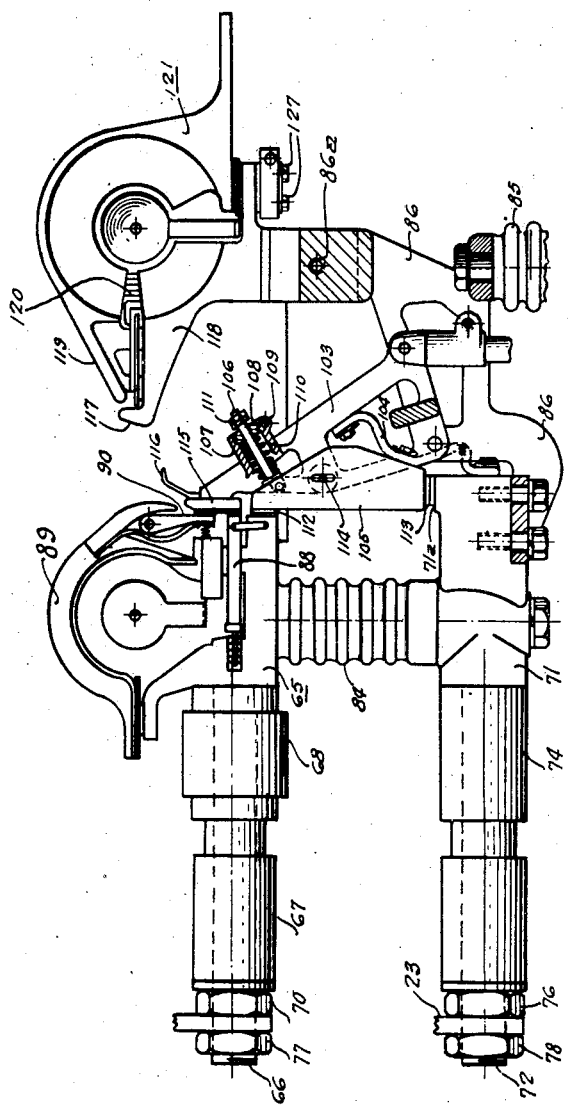
INVENTOR
William M. Scott Jr.
BY Cornelius D. Ehret
ATTORNEY Patented Oct. 14, 1941

2,259,005

UNITED STATES PATENT OFFICE 2,259,005

CIRCUIT CONTROLLING DEVICE

William M. Scott, Jr., Bryn Mawr, Pa., assignor to I-T-E Circuit Breaker Company, Philadelphia, Pa., a corporation of New Jersey Original application August 27, 1938, Serial No. 227,089. Divided and this application April 25, 1940, Serial No. 331,507

20 Claims. (Cl. 200—147)

My invention relates to circuit-controlling apparatus, and particularly to circuit-breakers provided with arc-extinguishing devices.

In accordance with my invention, the movable contact structure of a switch or circuit-breaker comprises a movable frame or member upon which is mounted both a rigid contact element disposed to engage a contact element of the stationary contact structure of the switch or circuit-breaker, and a rigid contact member movable with and with respect to said frame for engagement with another contact element of the stationary contact structure; more particularly, the aforesaid contact elements of the stationary contact structure are connected to a blow-out coil included in circuit upon circuit-opening movement of said movable contact structure.

Further in accordance with my invention, a blow-out coil for a switch or circuit-breaker is disposed within a housing formed by arcing horn members which, preferably, are mechanically secured to each other and electrically connected to terminals of the blow-out coil; more particularly, the magnetic core of the coil is received by insulators which are preferably held in position by means clamping, to opposite ends of the core, pole pieces secured to the walls of an arc chute.

Further in accordance with my invention, a circuit-breaker or switch is provided with arc-extinguishing means comprising barriers of insulating materials, preferably of fibre or other material serving as a source of arc-extinguishing gases, spaced lengthwise of the arc, portions of which are forced, as by a blow-out coil, to elongate in loops between the barriers; more particularly, the barriers are constructed to restrict other portions of the arc, and beyond the barriers is disposed a metallic grid structure for chilling that portion, or portions, of the arc which expands beyond the barriers and for chilling the aforesaid gases.

My invention further resides in the features of construction, combination, and arrangement hereinafter described and claimed.

This application is a division of my co-pending application Serial No. 227,089 filed August 27, 1938.

For an understanding of my invention, reference is made to the accompanying drawings in which:

Fig. 2 is a perspective view, on enlarged scale, of the frame of the circuit-breaker unit of Fig. 1.

Fig. 2A is a rear view of the frame shown in Fig. 2.

Fig. 5 is similar to Fig. 3 but with the contacts in open-circuit position.

Fig. 6 is a perspective view, on enlarged scale, of a bridging contact element shown in Fig. 5.

Figs. 7 to 9 inclusive, are perspective views of the components of a blow-out assembly shown in Fig. 5.

Fig. 10 is a front elevational view, with parts broken away, of a blow-out assembly shown in Fig. 5.

Figure 11:
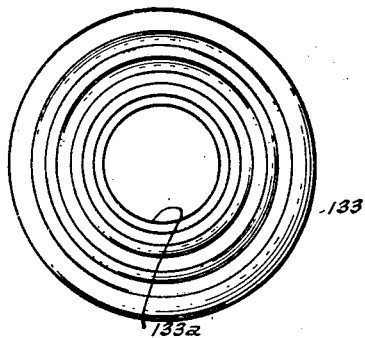

Fig. 11 is a side elevational view of an insulator shown in Fig. 10.

Figure 12:
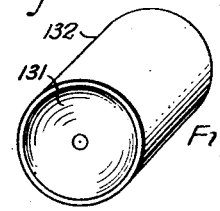

Fig. 12 is a perspective view of the core member shown in Fig. 10.

Figure 1:
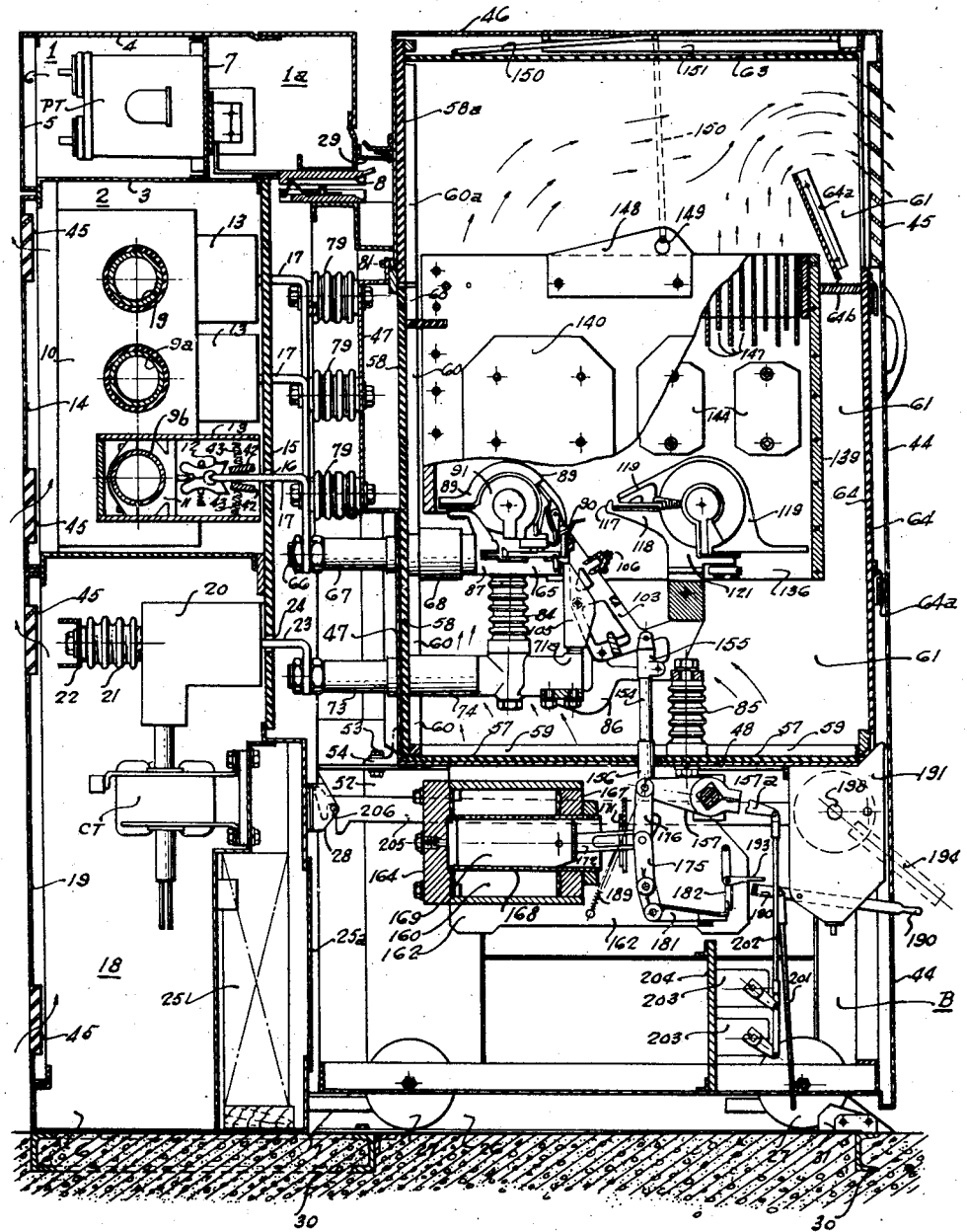
Fig. 1 is a side view, in section, of a truck type circuit breaker and associated switchboard.
Figure 13:
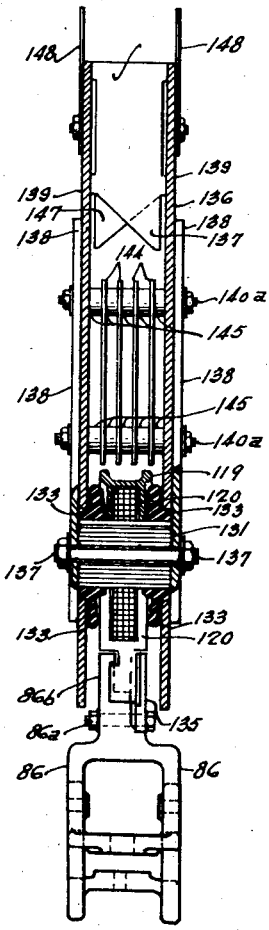

Fig. 13 is a sectional view of an arc-chute and blow-out assembly shown in Fig. 1.

Figure 14:
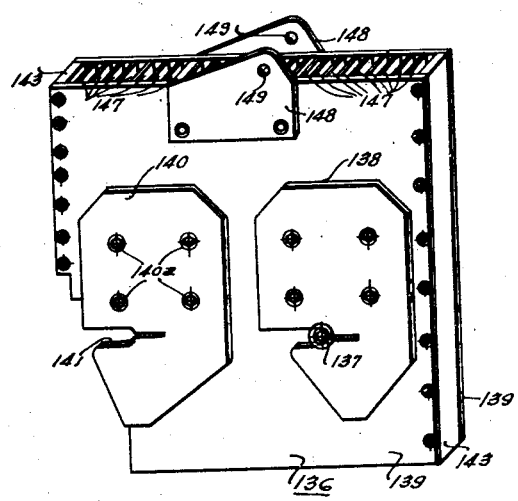

Fig. 14 is a perspective view of the arc-chute of Fig. 13.

Figure 15:
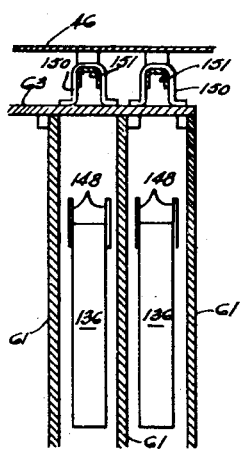
Figure 16:
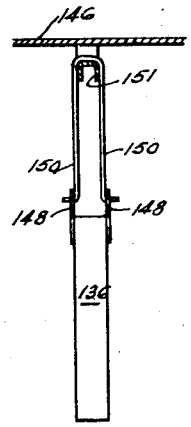

Figs. 15 and 16 are explanatory figures referred to in discussion of removal of arc-chutes.

Referring to Fig. 1, the uppermost compartments 1 and 1a of switchboard unit S are sealed from the next lower compartment 2 by the horizontal steel barrier 3; the upper wall 4 of the compartments 1, 1a is a steel plate forming the top of the unit; the rear wall of the compartment 1 is the removable steel cover plate 5; the sides of the compartment 1 are formed by side plates 6 extending from top to bottom of the unit. The steel partition 7 isolates the two compartments 1 and 1a from each other.

The upper compartments 1, 1a contain auxiliary apparatus such as potential transformers T, relays, and wiring from contacts 8 which are suitably mounted on the under side of that portion of the bottom of compartment or duct 1a which projects beyond the front wall of compartment 2. Other auxiliary apparatus as meters, control switches and the like, may be mounted upon the left face (Fig. 1) of panel 5 for observation or operation from the rear of the switchboard.

Within the compartment 2 are supported the three bus conductors 9, 9a, 9b each wrapped in phenolic insulation, molded and cured in position and clamped in the impregnated maple blocks 10 to withstand short-circuit stresses. To each tubular bus is directly attached a support 11 for disconnect contacts 12 whose purpose and construction are described and claimed in my copending application Serial No. 331,697, filed April 26, 1940. Each of the disconnect contact assemblies is enclosed in its individual housing 13 of insulating material. The rear wall of compartment 2 comprises the removable panel 14 and the front wall thereof comprises the upper part of the panel 15 which is of insulating material and in which there are three staggered slots 16 for permitting contacts 17 extending from the rear of the circuit-breaker unit B to pass into through the panel into the similarly staggered disconnect housings 13. Thus, when the unit B is withdrawn, it is impossible for an attendant accidentally to touch any parts at high potential.

The bottom compartment 18 of the switchboard unit S, whose rear face is closed by the removable steel panel 19, contains disconnect contacts, suitably encased in insulating housings 20, current transformer CT, and the outgoing cable connections therefrom. The housings 20 are supported by insulators 21 from the cross brace 22 in alignment to receive the contacts 23 which pass through slots 24 in lower part of panel 15 from the rear of the breaker unit B. The duct 25 along the front face of compartment 18 may be used to encase the wires from the transformer CT to a relay which controls tripping of the circuit-breaker. Access to the interior of duct 25 may be had by removal of the steel panel 25a.

Extending from the front of unit S are the rails 26 for guiding the wheels 27 of circuit breaker unit B, a pair of lugs 28 for racking bars 205, and a dust shield 29 for the auxiliary contacts 8. The rails 26 extend upwardly from the steel base plate 30 from which also extends the cam 31 for tripping the circuit-breaker as the truck is moved toward or from the position shown in Fig. 1.

Across the open front end of each of the housings 13 extend two pivotally mounted shutters 42 of insulating material biased toward engagement with each other by springs 43. The gap between the forward edges of the shutters is in alignment with the corresponding slot 16, Fig. 1, in the panel 15 of insulation closing the front face of compartment 2 of the switchboard. When the circuit-breaker unit B is pushed into position, each of the disconnect contacts 17 enters its corresponding slot 16, separates a pair of shutters 42, and slides between the upper and lower disconnect contacts 12. When the unit B is completely withdrawn, the shutters 42, 42 within each housing close the corresponding panel slot 16 and preclude accidental contact with the bus conductors.

The truck unit B is a substantially rectangular structure formed by angle iron and sheet steel suitably joined as by welding. The door 44 which permits access to the circuit-breaker mechanism hereinafter described is provided near the top with a louvered opening 45 to permit escape of gases incident to circuit interruption. In the particular construction shown in Fig. 1, the top of the truck structure is closed by a sheet metal wall 46.

The circuit-breaker and its operating mechanism is removable as a unit from the rear of the truck structure. The framework 51 of the unit, shown in Fig. 2, comprises a sheet-steel and angle iron structure having a vertical wall 47 and a horizontal wall 48 connected and braced by gusset plates 49 having therein holes 50 to receive crane hooks. Holes 50 are approximately in line with the center of the gravity of the unit to facilitate its manipulation while suspended from a crane.

The frame 51 is slidable along and supported by the angle irons 52 extending across the sides of the truck and is held in position by bolts 53 (Fig. 1) which pass through the angle pieces 54 projecting rearwardly from the rear wall 47 of the frame 51. The brackets 55 serve to guide the frame during insertion and withdrawal of the circuit-breaker unit.

The upper face of the horizontal panel 48 and the front face of the vertical wall 47 are covered or lined with the panels 57, 58 of insulating material. The strips 59 of insulating material projecting upwardly from horizontal panel 57, and similar strips 60 extending forwardly from vertical panel 58 form slots for receiving the bottom and rear edges of the panels 61 of an interpole barrier unit. The top of the barrier unit 62 is closed by panel 63 which, like its vertical panels 61, is of insulating material. The front of the barrier unit 62 is closed by panel 64 of insulating material from the bottom to a level somewhat below that of louver 45 leaving the upper, forward parts of the isolated compartments formed by the panels 61, 63, 57 and 58 open for discharge of arc gases. Preferably, short horizontal ledges 64a project inwardly of the compartments from or adjacent the upper edge of panel 64 to prevent the arc gases from flowing downwardly and adjacent the contact structure of the circuit-breaker.

The interpole barrier unit 62 is removable from the front of truck B by opening door 44 and pulling the barrier unit forward in the slots provided by guides 59.

Figure 3:
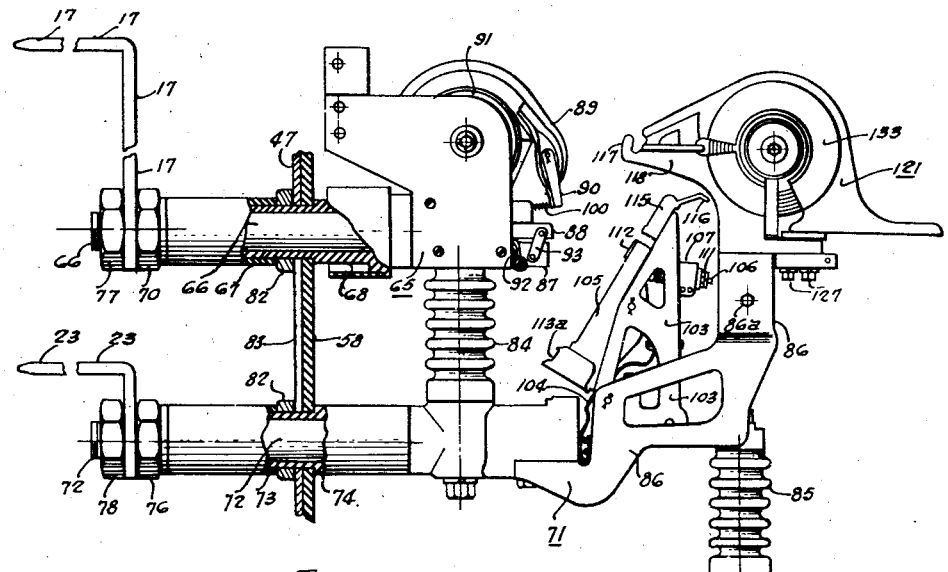
Fig. 3 is a detail view, in side elevation, of the contact structure of the circuit-breaker of Fig. 1.

The circuit-breaker shown herein is a three-pole breaker but since the construction of all three poles are similar, only one need be described. Referring to Figs. 1, 3 and 5, the fixed contact assembly 65 comprises a stud 66 which passes through the sleeves 67, 68 of insulating material, at least one of which has an end 69 of reduced diameter to fit an opening in the rear vertical wall of frame 51. By tightening nut 70 on stud 66, the two sleeves 67, 68 are forced tightly against opposite sides of the vertical wall of frame 51. Similarly, the movable contact assembly 71 is mounted upon a stud 72 which passes through sleeves 73, 74 of insulating material at least one of which has an end of reduced diameter for fitting a hole in the vertical wall of frame 51. By tightening nut 76, the sleeves 73, 74 are clamped to opposite sides of the rear vertical wall of the frame 51. The disconnect contacts 17, 23 are held to the studs 66, 72 by the nuts 77, 78, respectively.

The upper end of each of the disconnect contacts 17 is braced by an insulator 79, Fig. 1, to resist bending during insertion and withdrawal of the circuit-breaker unit B from the switchboard. The insulators 79 are secured to and project horizontally from the rear face of the upper part of the steel wall 47 of frame 51.

Preferably, the portion of wall 47 which supports insulators 79 lies in a plane farther to the rear than the plane of that portion of the wall from which the studs 66, 72 extend. The uppermost portion of wall 47 is provided with a series of holes 80, Fig. 2, through which pass screws 81, Fig. 1, for securing it to the rear face of the truck. These screws, as well as screws 53, are removed for withdrawal of the frame 51 on which all of the contact structure and operating mechanism therefor is mounted.

Reverting to the mounting of the contact assemblies 65 and 71, either of two alternative arrangements may be used. In Fig. 2A the steel plate 47a is provided with annular inserts 82 of brass or other non-magnetic material whose openings fit the reduced ends 69, 75 of the insulating sleeves 67, 73, shown in Fig. 3. Between each pair of inserts, the plate 47a is provided with a slot 83 to eliminate or minimize eddy currents. For plate 47a may be substituted a plate or casting entirely of bronze or other suitable non-magnetic material provided with openings which fit the reduced ends of the insulating sleeves 67, 73.

The stationary contact assembly 65 and the movable contact assembly 71 are mechanically interconnected by the insulator 84 which resists forces due to flow of heavy currents tending to move these assemblies away from each other. The insulator 85 mechanically connected to the frame member 86 of assembly 71 and to the base plate 48 of the unit frame 51 stiffens or supports the assembly 71 against the blows or shocks incident to the opening movement of the parts of the circuit breaker.

Figure 4:
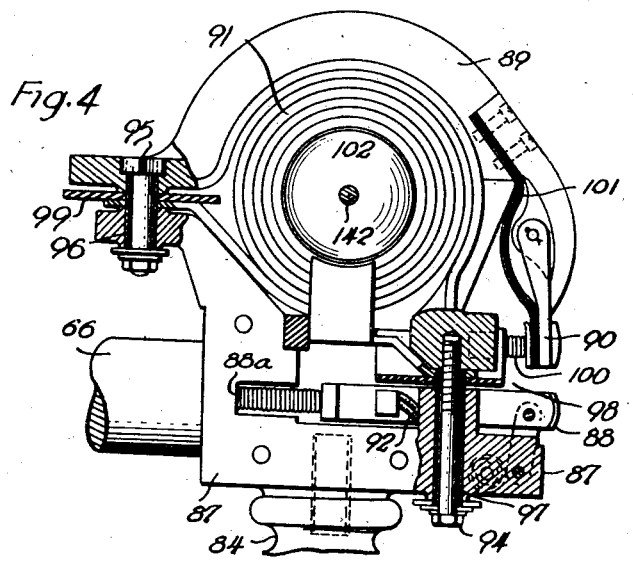
Fig. 4 is a side elevational view, partly in section, and on enlarged scale, of a blow-out and contact assembly shown in Fig. 1.

The stationary contact assembly, Fig. 1, 3 and 4, comprises the main contact member 87, the auxiliary contact member 88, the arcing horn 89, the arcing tip 90, and blow-out coil 91. The auxiliary contact 88 is biased to the position shown in Fig. 3 by a spring 88a and connected by pigtail 92 to the main contact 87. A pair of links 93 on opposite sides of contacts 87, 88 support and guide the latter during its movement.

The arcing horn 89 is mechanically connected to the main contact 87 by bolts 94, 95, Fig. 4, which pass through sleeves 96, 97 of insulating material and clamp the front and rear ends of the horn against the plates 98, 99 of insulating material. The arcing tip 90 is supported from the rear face of the forward end of horn 89 and biased toward engagement with the end of the horn by spring 100. Pigtail 101 connects the movable arc horn tip 90 to the horn 89. One end of the blow-out coil 91 wound upon core 102 is held in electrical connection with main contact 87 by the bolt 95 and the other terminal of the coil is held in electrical connection with the arcing horn structure by the bolt 94.

The movable contact assembly 71, Figs. 1, 3 and 5, comprises the stationary frame member 86 within which is pivotally mounted the movable frame member 103 connected by pigtail 104 to the stationary frame member and to the bridging contact member 105 loosely pivotally mounted in or between the sides of the movable frame member 103. The rod 106 pivotally connected to the bridging contact member 105 near the upper end thereof passes through the split tubular structure 107 and through the plug 108 threaded into the outer end thereof. Bolts 109 may be tightened to clamp the split housing 107 upon the plug 108 and so hold it in the position affording the desired compression of spring 110 between plug 107 and a shoulder on the rod 106. The nuts 111 on the free end of rod 106 serve as a stop limiting the extent of its forward movement when the circuit-breaker is open.

The upper contact piece 112 of the bridging contact member 105, Figs. 5 and 6, engages the upper main contact 87 in a vertical plane and the lower contact piece 113 engages the lower main contact 71a in a horizontal plane. During closure of the circuit-breaker, the contact 112 engages contact 88 and causes member 105 to pivot about pin 114 to effect wiping engagement between the lower movable contact 113 and stationary contact 71a. The engagement of these lower contacts and continued movement of frame 103 causes member 105 to move upwardly and insure wiping engagement between the upper contact 112 and the stationary contact 88. When the circuit-breaker is fully closed, the spring 110 exerts a force having one component acting horizontally to determine the contact pressure between the upper contacts 112, 88 and another component acting at right angles thereto to determine the contact pressure between the lower contacts 113 and 71a.

To the upper end of movable frame member 103 is attached the arcing contact 115 which, when the circuit breaker is closed, engages both the auxiliary contact 88 and the movable arcing horn tip 90. When the circuit-breaker is tripped the contact 115 first separates from the auxiliary contact 88 thus to include the blow-out coil 91 in circuit. After separation of contact 115 from the horn tip 90, the arc extends from the horn 89 to arcing tip 116 extending from the movable arc contact 115 until the tip 116 moves sufficiently close to the tip 117 of a second, stationary arcing horn 118 connected by bolt 86a to the frame 86. When the arc jumps from the tip 117 to the upper arcing horn 119, a second blow-out coil 120 is included in circuit to force the arc upwardly into the arc-chute hereinafter described.

The construction of the front blow-out assembly 121 comprising the upper and lower arcing horns 118, 119 and coil 120 is more clearly understood from Figs. 9 to 13. When the upper horn 119, Fig. 9, and the lower horn 117, Fig. 7, are in their assembled position, they provide a housing or casing for the blow-out coil 120 (Fig. 13) one terminal 122 of which is held in electrical contact with the upper horn 119 by bolts, not shown, which pass through insulating sleeves and washers, through holes 123 in the lower horn 118, and holes 124 in terminal 122 to thread into holes in the under face of block 125 integral with the upper horn 119. Similarly, the other terminal 126 of the blow-out coil 120 is held in electrical contact with the lower horn 118 by bolts 127 which pass through insulating sleeves and washers, holes 128 in the lower horn 118, and holes 129 in coil terminal 126 to thread into holes in the under face of projection 130 of the upper horn 119.

The core 131 for the blow-out coil is preferably formed by winding a strip of thin sheet iron to form a cylinder received by a tube 132 of insulating material, Fig. 10. The outer diameter of tube 132 corresponds with the diameter of the holes 133a through the insulators 133 received by annular recesses 134 in the sides of the upper and lower horn assembly. The inner faces of the insulators, Fig. 13, are out of contact with and appreciably spaced from the arcing horns except adjacent the core. The front blow-out assembly is held to frame 86 by bolt 86a which holds the extension 118a of the lower horn between the clamping plate 135 (Fig. 13) and the extension 86b of the frame 86.

In the preferred arrangement shown, the front blow-out assembly is removable as a unit with the arc-chute assembly 136 (Figs. 1, 13 and 14). The bolt 137 which passes through the core 131 of the front blow-out coil 120 clamps it against the pole pieces 138 held against the outside faces of the side panels 139 of the arc chute. The pole pieces 140 for the rear blow-out coil 91 are also held, as by bolts 140a, against the outside faces of the side panels. The slots 141 in the rear pole pieces are suited to receive the bolt 142 which passes through the core 102 of the rear blow-out coil 91. By loosening the nuts on bolt 142 and bolt 86a, the arc-chute and front blow-out assembly may be slid forwardly from the circuit-breaker contact structure and out of the truck B through its door 44.

The side panels 139 and end panels 143 of the arc chute are of suitable insulating material. Within the arc chute above the arcing horns are four groups of spaced plates 144 of insulating material, for example, which serve to split the arc lengthwise as it rises in the chute and as a source of arc-quenching gases. The plates 144 of each group are suitably separated as by spacers 145 (Fig. 25) and held in position by a pair of bolts 146. If the arc rises above plates 144, it is lengthened and split into a large number of arcs in series by the series of metal plates 147 spaced from each other in the top of the arc chute. This construction is generally similar to that disclosed and claimed in United States Letters Patent No. 2,030,582 to Graves.

To facilitate withdrawal of the arc chutes, one for each pole of the circuit-breaker, from the truck, each of them is provided (Figs. 1, 13 and 14) with a pair of plates 148 held to the sides 139 of the chute and having holes 149 in their upper ends to receive the ends of an inverted U-shaped link 150, Figs. 15 and 16, suspended from the bars 151 suitably attached to the under face of the top wall 46 of the truck structure. When the interpole barrier assembly 62 is in place, the links 150 rest upon the top wall 63 of the barrier assembly as shown in Figs. 1 and 15 but when the barrier assembly is removed, the links 150 swing downwardly so that the lower ends thereof may be hooked into the holes 149 of the supporting plates 148 of any one or more of the arc-chute assemblies, Fig. 16.

To assist in alignment of the arc chutes 136, the rear upper end of each of them is received by a notch 152 in the plates 153 of insulation (Figs. 1 and 2) which project forwardly from the front face of the vertical wall 47 of the supporting frame for the contact structure of the circuit-breaker.

All of the operating mechanism for the circuit-breaker is supported from the under face of the horizontal wall 48 of the frame 51 and the only connections between the movable contact structures and their operating mechanism are the rods 154 of insulation; the upper end of each rod 154 is received by a coupling member 155 pivotally connected to the movable frame 103 for the movable contact structure of one pole of the circuit breaker and the lower end of each rod 154 is received by a coupling member 156 pivotally connected to an operating arm 157 (Fig. 1). All of the operating arms 157 are secured to a single shaft 158 supported at its ends by brackets attached to and depending from the horizontal wall 48 of the frame 51 and supported intermediate its ends by split bearings 159.

The coil 160 which may be energized to effect closure of the circuit-breaker is within a housing 161 (Fig. 1) having two sides formed by steel plates 162 which are attached to and depend from the wall 48 of frame 51 and two sides formed by steel plates 163 which extend between and are secured as by welding to plates 162. The rear wall of the housing is formed by the steel plate 164 held in place by screws 165 which pass through plate 164 threadably to engage blocks 166 welded to the inner rear corners of the housing. The front wall of the coil housing comprises steel plate 167 welded in place and provided with an opening to receive the guide tube 168 of nonmagnetic metal for the movable core 169. The rear end of the guide tube is received by a circular recess 170 in the rear wall 164 of the coil housing. The stop 171 for limiting the forward movement of the core 169 comprises a plate welded at its opposite ends to the plates 162 which are beyond the front wall of the coil housing.

The link 172 pivoted at its rear end to the front end of core 169 is provided with an elongated slot 173 which slidably receives the pivot pin 174 of the toggle links 175, 176. The upper end of toggle link 176 is pivotally connected by pin 177 to that one of the arms 157 which is attached to the central portion of shaft 158 between the plates 162 which support most of the circuit-breaker operating mechanism. The lower end of toggle link 175 is pivotally connected by pin 178 to a bell-crank lever 179 whose pivot pin 180 provides a fixed axis for angular movement of lever 179. The ends of pin 180 are supported by plates 162.

The arm 181 of lever 179 is engageable near its free end by the latching member 182 secured to shaft 183 and biased to its latching position by spring 184. When the tripping magnet, now shown, is sufficiently energized the movement of its armature rocks shaft 183 in counter-clockwise direction to release the latch 182, whereupon powerful springs 189 (one of which is shown) rocks the shaft 158 to open the circuit-breaker.

The circuit breaker may be tripped manually by depressing the handle or exposed end of lever 190 which is pivotally mounted within a housing or bracket 191 secured to the front end of the frame 51. The handle of lever 190, as shown in Fig. 1, projects through a slot in the door 45 of the truck. When the handle is depressed the extension 192 of lever 190 engages the extension 193 of latch 182 to effect its release from arm 181 and so permit springs 189 to open the circuit breaker.

The circuit breaker may be reclosed manually by inserting a bar 194 through an opening in the truck door and into the slot 196 of a disk 197 loosely mounted between the sides of bracket 191 on the shaft 198. A link not shown connects the disk 197 to the toggle pin 174. After the bar 194 is so inserted, it is swung upwardly through an arc of about 90° and so moves pin 174 to the left to rock shaft 158 through link 176 in clockwise direction to lift the rods 154 and so effect circuit-closing movement of the movable contacts of the circuit-breaker. If an overload exists, the circuit-breaker cannot be held closed by bar 194 because when the latch 182 is released, the toggle collapses and springs 189 are free to open the circuit breaker regardless of the position of disk 197.

Preferably, the edge of disk 197, which is visible through an opening in the truck door 44 is colored or otherwise marked to indicate whether the circuit-breaker is in open or close-circuit position. The disk 197 is biased by a spring not shown, to the "open-circuit" position so that it will move to that position when bar 194 is removed or released after tripping of the breaker during manual closure thereof. This spring also restores the arm 181 to its latching position after tripping of the circuit-breaker in readiness for subsequent resetting of the toggle incident to automatic or manual reclosure of the circuit breaker.

From the tripping lever 198 is suspended the rod 201 which extends through the base of the truck in line with the cam 31 on the base 30 of the switchboard to trip the circuit breaker, if it be closed, as the truck is pulled out of or pushed into the switchboard.

The bar 202 pivotally suspended from arm 157a on the operating shaft 158 of the circuit-breaker is utilized to operate the auxiliary switches 203 mounted upon the panel 204 suitably mounted in the lower compartment of the truck. These switches may be used to operate signal lights or perform other control functions in accordance with the position of the circuit-breaker.

The truck unit is locked in its innermost or normal position by a pair of bars 205 each having a hooked end which drops over and engages the pin 206 of one of the pair of abutment members 28 attached to the front face of each of the switchboard units S1—S6. The other end of each bar 205 is pivotally connected to an arm secured to shaft 198 to which is secured a second notched disk, not shown, accessible through the opening 145 in the door 44 of the truck.

The manner in which this second disk is operated to move the truck from the switchboard to and from a test-position or to and from a fully withdrawn position is described in my application Serial No. 251,500 filed January 18, 1939, a division of aforesaid application Serial No. 227,089. September 24, 1941

What I claim is:

1. A circuit breaker comprising a rigid frame, a contact structure supported therefrom, a rigid contact arm movable between open and closed circuit positions and supported from said frame, an inflexible contact member for engaging said contact structure loosely pivoted to said arm for movement with and with respect to said arm, a secondary contact electrically connected to said contact structure and mounted for movement relative thereto, and a secondary contact immovably secured to said arm for movement therewith into and out of engagement with said first-named secondary contact.

2. A circuit breaker comprising a rigid frame, a pair of stationary contact structures supported therefrom, a rigid contact arm movable between open and closed circuit positions, an inflexible contact member for bridging said contact structures loosely pivoted to said arm for movement with and with respect to said arm, a secondary contact electrically connected to one of said contact structures and mounted for movement relative thereto, and a secondary contact immovably secured to said arm for movement therewith into and out of engagement with said first-named secondary contact.

3. A circuit breaker comprising a rigid frame, a stationary contact structure supported therefrom, a rigid contact arm movable between open and closed-circuit positions and supported from said frame, an inflexible contact member for engaging said contact structure loosely pivoted to said arm for movement with and with respect to said arm, a secondary contact electrically connected to said contact structure and mounted for movement relative thereto, a secondary contact immovably secured to said arm for movement therewith into and out of engagement with said first-named secondary contact, and means for biasing said secondary contacts toward each other supplemented by the biasing effect of current traversing them.

4. A circuit breaker comprising a rigid frame, a pair of stationary contact structures supported therefrom, a rigid contact arm movable between open and closed circuit positions, an inflexible contact member for bridging said contact structures loosely pivoted to said arm for movement with and with respect to said arm, a secondary contact electrically connected to one of said contact structures and mounted for movement relative thereto, a secondary contact immovably secured to said arm for movement therewith into and out of engagement with said first-named secondary contact, and means for biasing said secondary contacts toward each other supplemented by the biasing effect of current traversing said secondary contacts.

5. A circuit interrupter comprising a rigid frame, stationary contact structure supported from said frame, a rigid contact arm supported from said frame, a contact member for engaging said stationary contact structure loosely pivoted to said arm for movement with and with respect to it, a secondary contact mounted for movement adjacent said stationary contact structure, a blowout coil supported from said stationary contact structure and electrically connecting it to said secondary contact, and a secondary contact rigidly secured to said arm for movement therewith into and out of engagement with the first-named secondary contact.

6. A circuit interrupter comprising a rigid frame, a pair of stationary contacts supported from said frame, a rigid contact arm electrically connected to one of said contacts, a rigid pivotal mounting for said contact arm, a contact member for bridging said stationary contacts loosely pivoted to said arm for movement with and with respect to it, a secondary contact mounted for movement adjacent the other of said stationary contacts, a blowout coil supported by said other of said stationary contacts and electrically connecting it to said secondary contact, and a secondary contact rigidly secured to said arm for movement therewith into and out of engagement with said first-named secondary circuit.

7. A circuit interrupter comprising a rigid frame, a contact assembly supported from said frame and comprising a main contact, an auxiliary contact movably supported thereon and directly electrically connected thereto, a blowout coil, and a second auxiliary contact movably supported from said main contact and electrically connected thereto through said blowout coil, a second contact assembly supported from said frame comprising a second main contact, a rigid contact arm electrically connected to said second main contact, a bridging contact loosely pivoted to said arm and movable therewith to engage both of said main contacts, and a contact rigidly secured to said arm for engaging both of said auxiliary contacts.

8. An arc-chute assembly removable as a unit from a circuit breaker and comprising side panels, spaced metal plates supported by and extending between said side panels, spaced plates of insulation supported from and extending parallel to said side panels within the arc chute, and a blowout coil and arcing horn unit supported between said side panels to force the arc successively to engage said plates of insulation and said metal plates.

9. A circuit breaker comprising a frame, stationary contacts supported from said frame, a blowout coil and arc-horn assembly mounted on one of said stationary contacts, and an arc-chute assembly removable as a unit from the circuit breaker comprising sides for disengageably connecting the chute to said coil and horn assembly, and a second blowout coil and arc-horn assembly disengageably connected to the other of said stationary contacts.

10. A blowout coil and arc-horn assembly comprising two horn members having therein recesses forming a coil housing, a blowout coil within said housing, and means for mechanically securing said members to each other and for electrically connecting the coil terminals to the different horn members.

11. A blowout coil and arc-horn assembly comprising two arc horn members having complementary internal recesses forming a coil housing, a blowout coil within said housing, a core for said coil, and disk insulators for receiving the opposite ends of the core.

12. An assembly comprising two arc horn members having complementary internal recesses forming a coil housing, a blowout coil within said housing, a core for said coil, disk insulators for receiving the opposite ends of said core, an arc chute having sides of insulating material and pole plates secured to the external faces thereof, and means for clamping said pole plates to the opposite ends of said core and to hold said insulators in position on said core between said sides of the arc chute.

13. A circuit controlling device having contacts normally in engagement to close a circuit, a plurality of plates of insulating material disposed substantially parallel to each other and to the longitudinal axis of the arc incident to separation of said contacts, means forcing the arc to re-split and pass between said closely spaced plates, and a plurality of metallic plates beyond said plates of insulating material disposed substantially parallel to each other and substantially at right angles to said axis of the arc.

14. A circuit-breaker comprising a rigid frame, a contact structure fixedly supported therefrom, a secondary contact electrically connected to said contact structure for movement relative thereto, a movable rigid arm supported from said frame, a secondary contact immovably secured to said arm for movement therewith to engage and effect movement of said first-named secondary contact structure, and a contact member for engaging said contact structure loosely pivoted upon said arm for movement bodily with respect to said arm and to said first-named secondary contact structure during final circuit-closing and initial circuit-opening movements of said arm.

15. A circuit-breaker comprising stationary main contact structure, a movable main contact structure normally in circuit-closing engagement with said stationary main contact structure, stationary arcing contacts adjacent the path of movement of said movable main contact structure, a blow-out coil connected between one of said arcing contacts and said stationary main contact structure for inclusion in series with the arc between and incident to initial separation of said main contact structures, and a second blow-out coil connected between said second arcing contact and said movable main contact structure for inclusion in series with said first blow-out coil by the arc drawn between said arcing contacts by movement of said movable main contact structure.

16. A circuit-controlling device having contacts normally in engagement to close a circuit, structure extending longitudinally of the arc incident to separation of said contacts to define a longitudinally restricted passage for said arc, means for forcing the arc through said passage restricted longitudinally thereof, an expansion chamber beyond said structure to receive and chill by expansion arc gases issuing from said restricted passage, and metallic grid structure for chilling the expanded gases as they pass from said chamber.

17. A circuit controlling device having contacts normally in engagement to close a circuit, structures of insulating material spaced from each other lengthwise of the arc incident to separation of said contacts to provide between said structures a substantially unrestricted passage for an intermediate portion of the arc and constructed to provide transversely restricted passages for other portions of the arc, and means for forcing said intermediate portion of the arc to move as a loop in said unrestricted passage.

18. A circuit controlling device having contacts normally in engagement to close a circuit, structures of insulating material spaced from each other lengthwise of the arc incident to separation of said contacts to provide between said structures a substantially unrestricted passage and constructed to provide transversely restricted passages extending lengthwise of the arc, an expansion chamber in communication with said restricted and unrestricted passages, and means for forcing the arc to move through said restricted and unrestricted passages toward said chamber.

19. A circuit controlling device having contacts normally in engagement to close a circuit, structures of insulating material spaced from each other lengthwise of the arc incident to separation of said contacts to provide between said structures a substantially unrestricted passage for an intermediate portion of the arc and constructed to provide transversely restricted passages for other portions of the arc, and metallic grid structure beyond said structures for chilling any portion of the arc reaching it through said restricted or unrestricted passages.

20. A circuit controlling device having contacts normally in engagement to close a circuit, structures of insulating material serving as a source of de-ionizing gases spaced from each other lengthwise of the arc incident to separation of said contacts to provide a substantially unrestricted passage for an intermediate portion of the arc and said gases and constructed to provide transversely restricted passages for other portions of the arc and said gases, metallic grid structure disposed beyond said restricted and unrestricted passages for chilling said gases and any portion of the arc reaching it through said passage, and means for forcing the arc from said contacts toward said grid structure through said paths.

WILLIAM M. SCOTT, JR.